United States Patent

[11] 3,627,436

[72] Inventors Ralph D. Adams
 Glendora;
 Rudolf Richard Schindler, Los Angeles, both of Calif.
[21] Appl. No. 24,045
[22] Filed Mar. 24, 1970
[45] Patented Dec. 14, 1971
[73] Assignee Omark-Winslow Aerospace Tool Co.

[54] TOOL FEEDING APPARATUS
 39 Claims, 17 Drawing Figs.
[52] U.S. Cl. .................................................. 408/13, 408/79
[51] Int. Cl. ............................................. B23b 41/00, B23b 45/14, B23b 39/26
[50] Field of Search .................................... 408/13, 14, 79, 91

[56] References Cited
UNITED STATES PATENTS
3,285,102  11/1966  De Voss ........................ 408/104

Primary Examiner—Francis S. Husar
Attorney—Forrest J. Lilly

ABSTRACT: A drilling apparatus mounted on and traveling step by step along a track mounted on a work panel and drilling a row of spaced holes in the panel in accordance with the spacing of positioning slots in a template on the track. A collet-type clamp unit trails the drill unit and clamps the drill unit against the panel prior to each drilling operation, the drill unit being adjustable in two perpendicular planes so as to be normal to the surface to be drilled. Two latching mechanisms are fixed respectively to the drill unit and the clamp unit to locate these units along the track, and a reciprocating actuator steps first the drill unit and then the clamp unit to successive positions along the template.

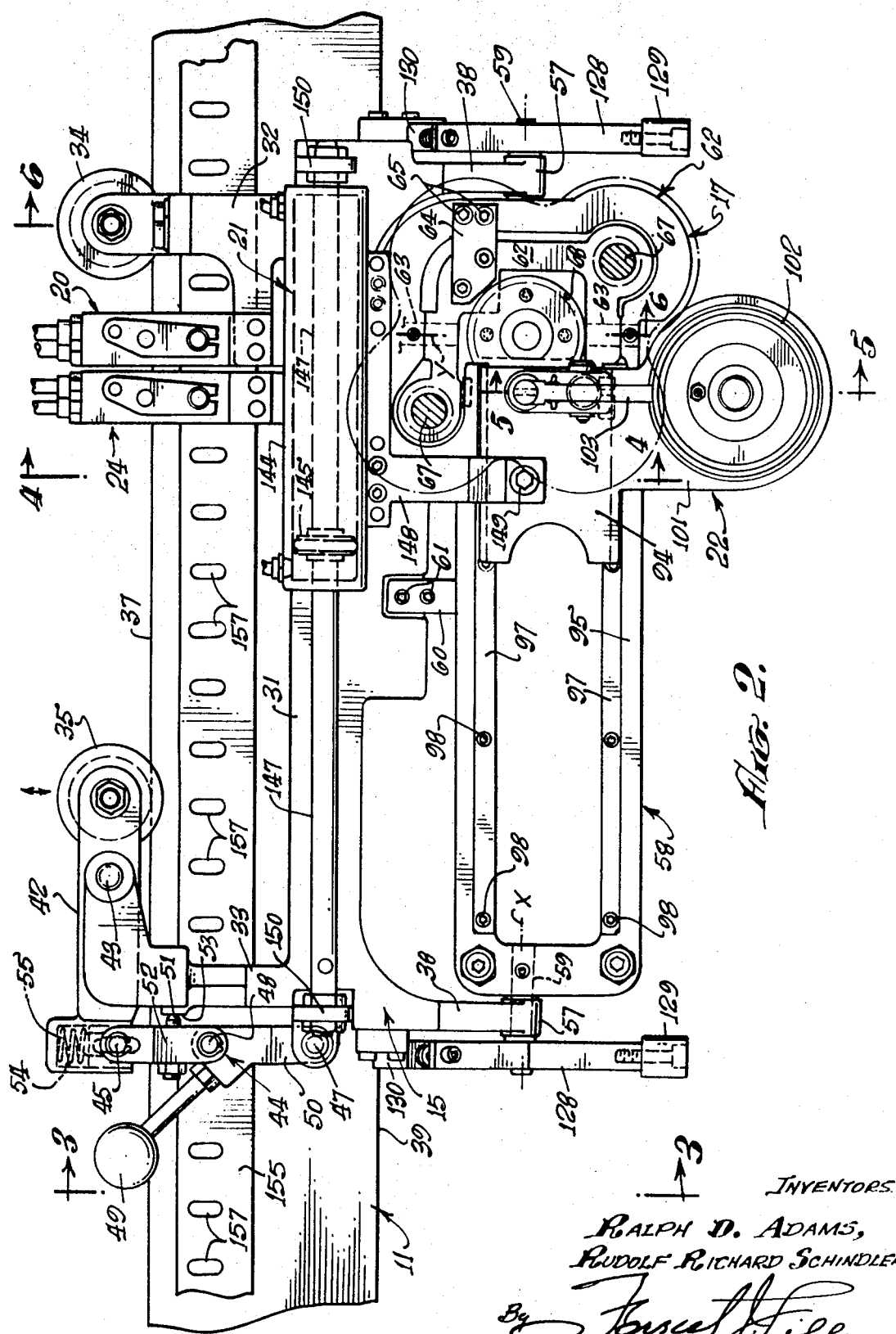
FIG. 2.
INVENTORS.
RALPH D. ADAMS,
RUDOLF RICHARD SCHINDLER,
ATTORNEY

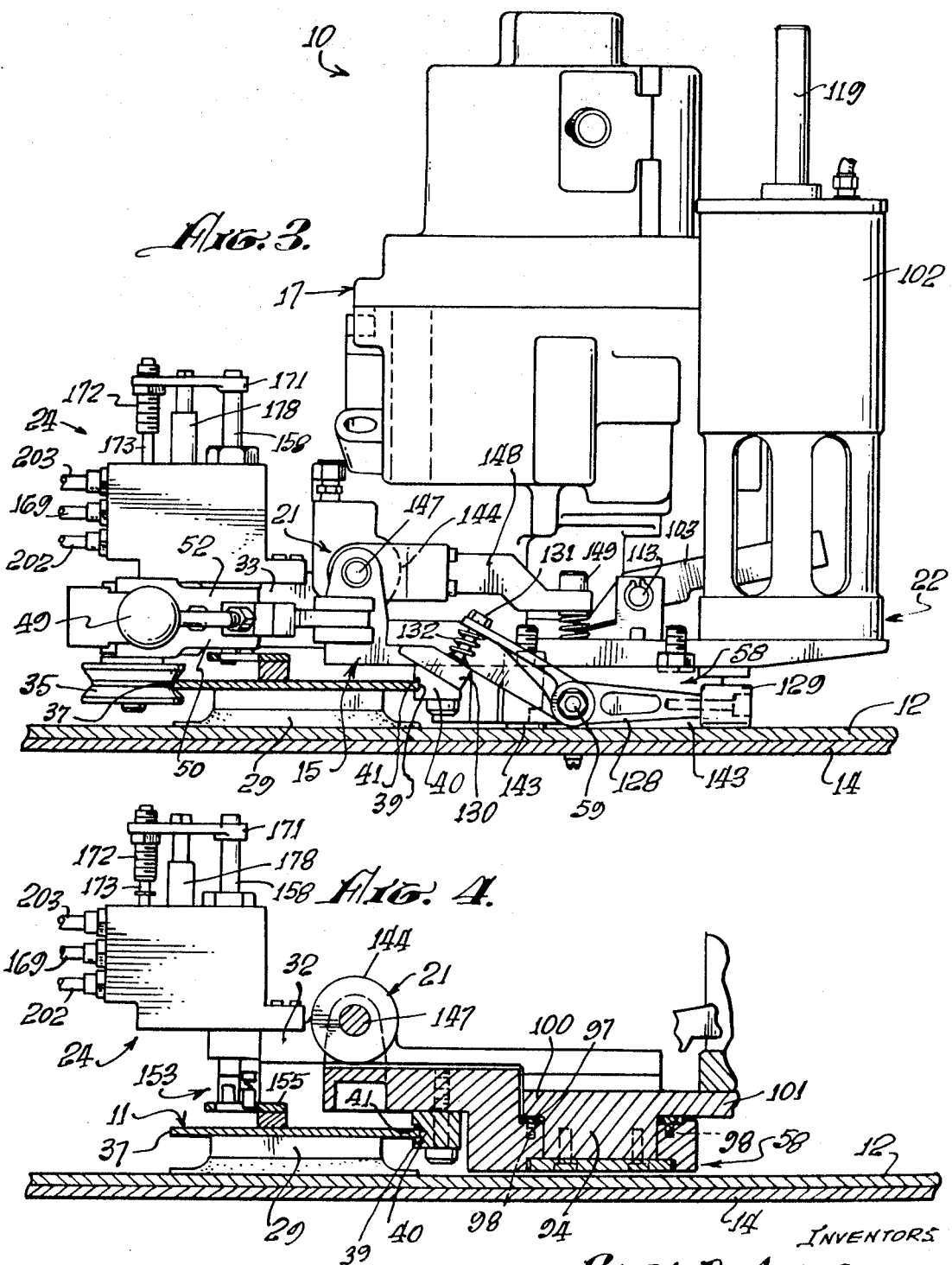

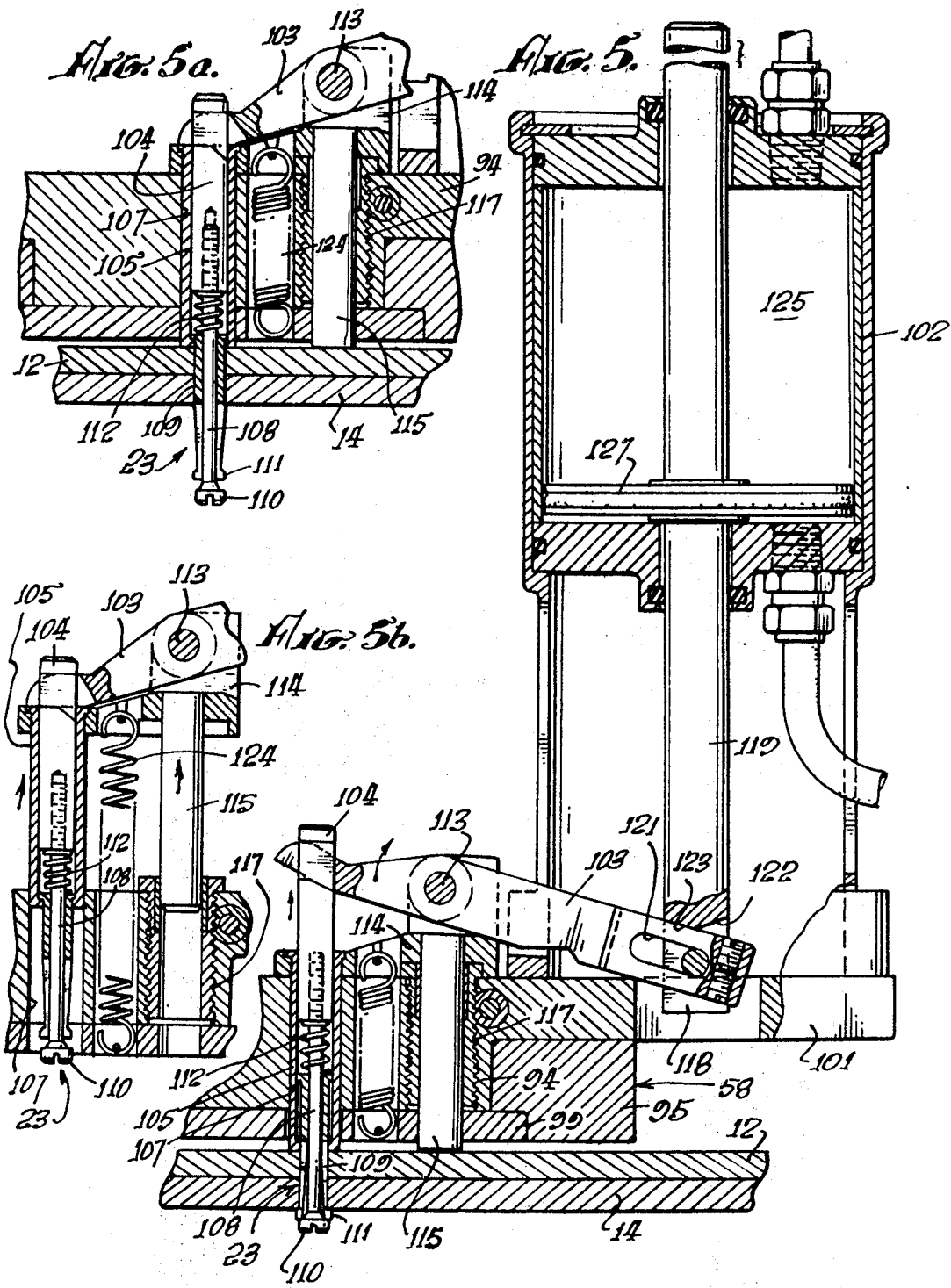

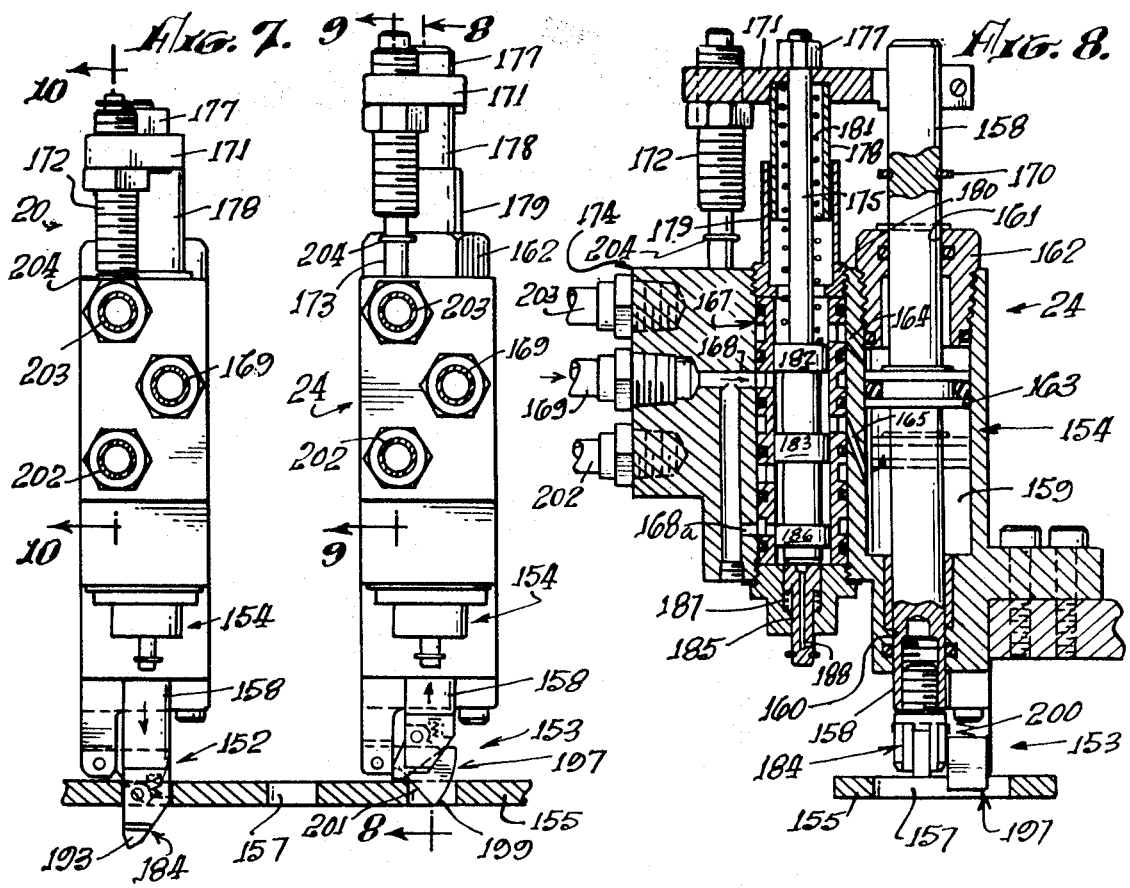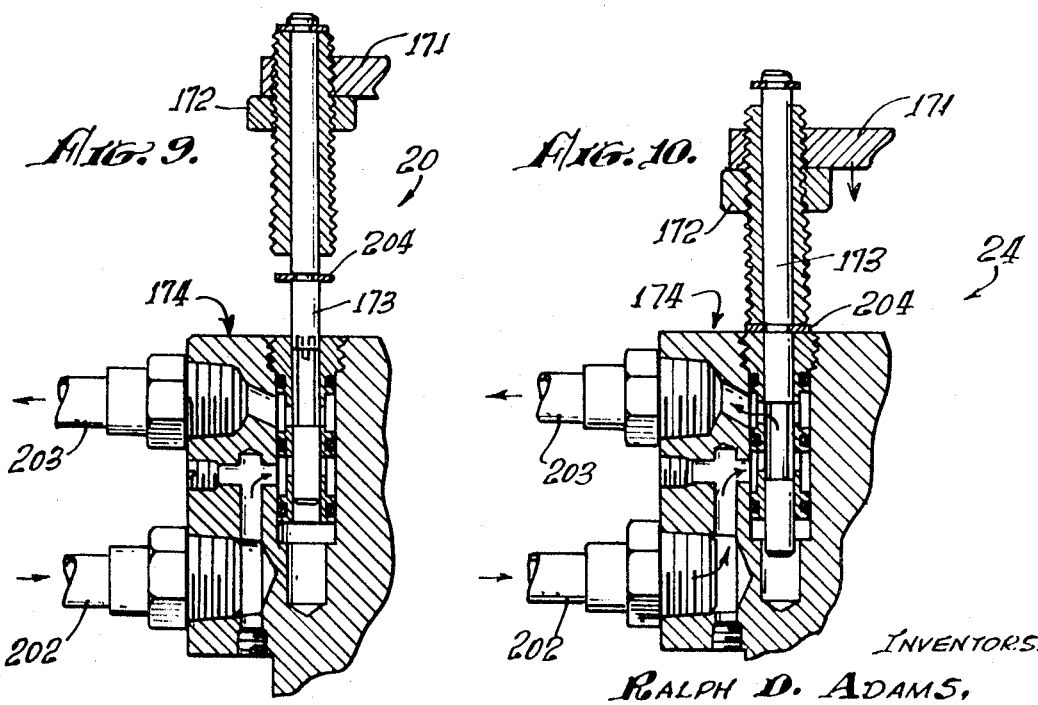

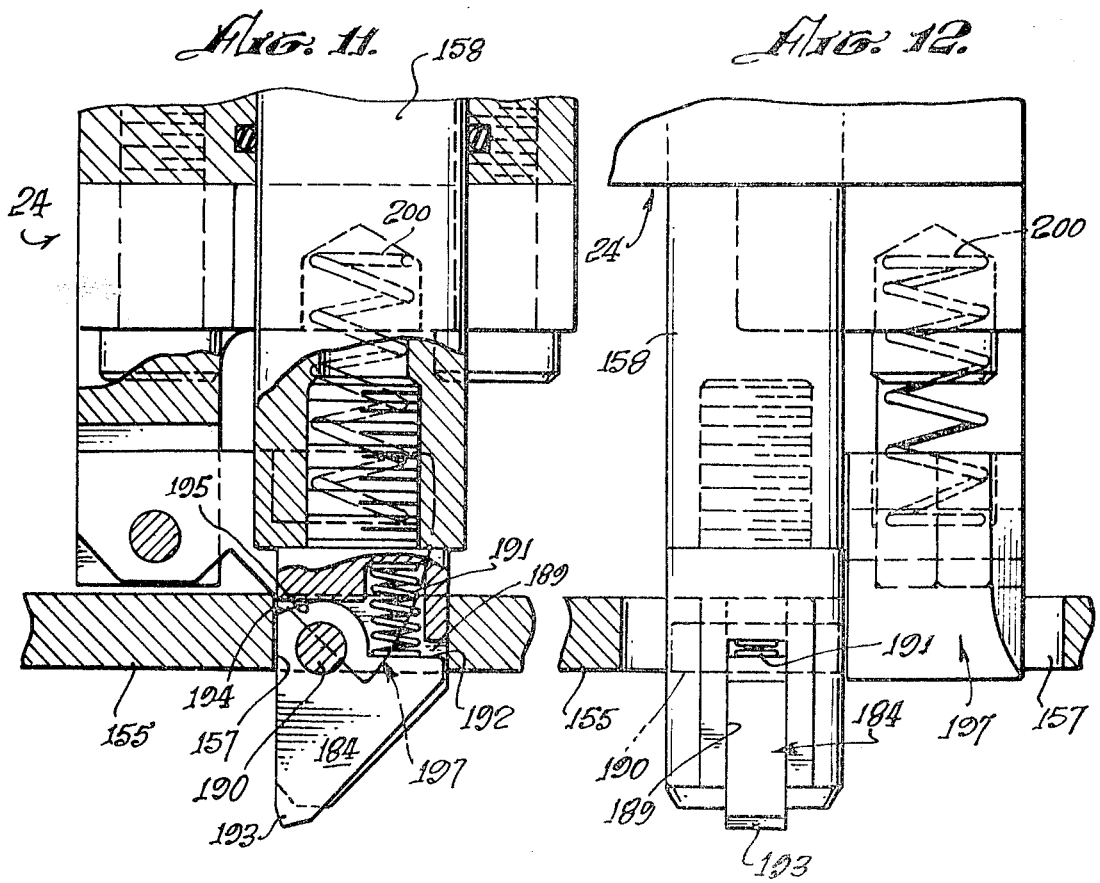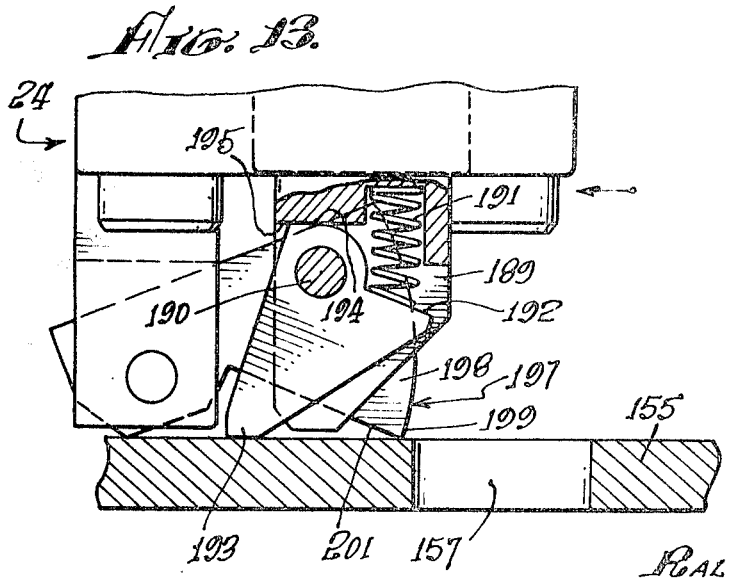

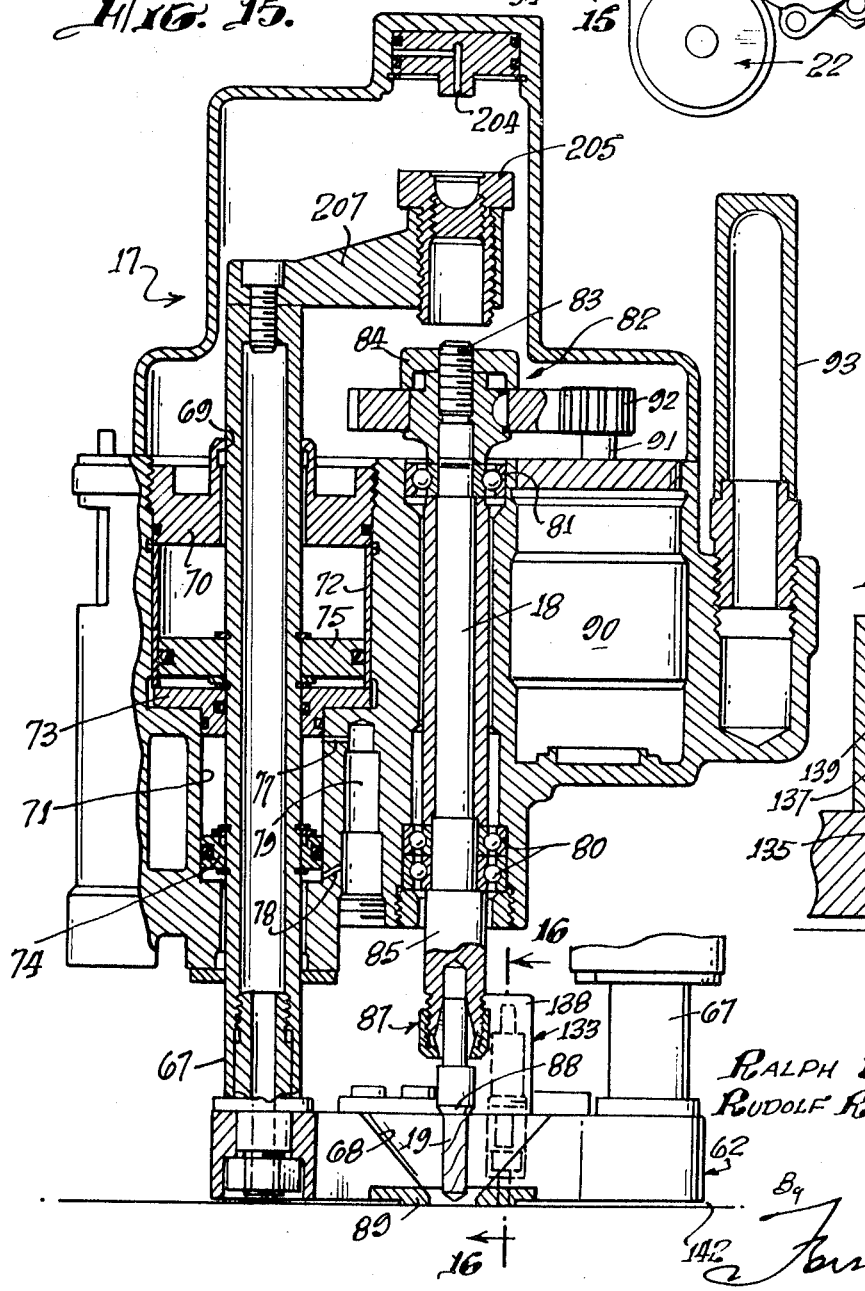

TOOL FEEDING APPARATUS

BACKGROUND OF THE INVENTION

This invention relates generally to apparatus for feeding tools relative to workpieces into different positions along the workpieces for the performances of successive operations on the workpieces, and relates more particularly and illustratively to a drilling apparatus for traveling step by step along an elongated track mounted on a work panel while drilling a row of spaced and precisely located holes in the panel.

The invention has particular utility in the fabrication of aircraft, and specifically in the drilling of rows of holes in panels forming the skin of an aircraft, the holes extending through the panels and into either lapped panels or other structural members such as stringers or bulkheads to which the panels are to be fastened, typically by riveting. Because of the curvature of such panels and the importance of keeping the heads of the rivets flush with the skin, the drilling tool must be maintained substantially normal to the panel during drilling to insure that the holes and their countersunk outer ends are properly formed.

In presently accepted commercial practice an elongated template strip is attached to a panel in overlying relation with the area in which the holes are to be drilled, and are formed with a series of guide holes for receiving the end or mask of a hand-held drill and thereby locating the drill for each hole. With the drill thus located, a skilled operator manually drills a row of holes along the template strip while attempting to hold the drill normal to the panel for each hole. This procedure is time consuming and expensive, and the quality of the work varies with the skill of the operator.

Efforts have been directed to the automation of such drilling operations, but have not satisfactorily solved all of the problems. One example of a prior automatic apparatus for drilling rows of holes in panels is the assembly shown in U.S. Pat. No. 3,285,102, in which a drill is slidable along a rail attached to the workpiece and is fed from one drilling position to the next by a chain and sprocket drive. No automatic apparatus has as yet found wide commercial acceptance, for various reasons including problems in feeding the drill rapidly from one drilling position to the next, in holding the panel securely against deflection during drilling, in maintaining the drill substantially normal to the area being drilled, and particularly in positioning the drill accurately for precise location of each hole in the panel.

SUMMARY OF THE INVENTION

The present invention provides a new and improved drilling apparatus that is capable of fully automatic operation in drilling a row of accurately located holes in a workpiece such a curved aircraft panel, and which drills the holes substantially normal to the area being drilled and precisely in accordance with a preselected arrangement for the holes. The drilling apparatus is mountable on a track attached to the workpiece to be drilled, is movable rapidly along the track into successive precisely located drilling positions, and drills an accurately located hole in each position while clamping the work against excessive deflection during drilling.

More specifically, the preferred embodiment of the invention shown herein for purposes of illustration comprises a drill unit supported on a carriage that is mountable in a track, a template on the track having positioning abutments spaced longitudinally of the track in accordance with the desired spacing of the holes, indexing means on the carriage for locating the drill in successive positions along the template, and a stepping actuator cooperating with the indexing means to drive the apparatus along the template in steps precisely related to the spacing between successive positioning abutments. To brace the work against deflection during drilling, a clamp unit is mounted on the carriage to trail the drill unit and includes a clamping element in the form of an expandable collet sleeve that is inserted in each hole after removal of the drill and is operable to pull the work toward the drill carriage into firm engagement with the drill unit preparatory to drilling.

The indexing means include two latching mechanisms having latch elements that are spaced apart longitudinally of the template and are engageable with successive positioning abutments thereon, one latching mechanism being fixed relative to the drill unit to locate the latter at the end of each forward step of the drill carriage, and the other being fixed relative to the clamp unit to align the collet sleeve with each hole after removal of the drilling tool. The stepping actuator is a reciprocating cylinder attached to one of the latching mechanisms and having a piston rod attached to the other so that alternate extension and retraction of the cylinder, with correlated engagement and disengagement of the latching mechanisms, walks the drilling apparatus step by step along the template.

Other features of the invention include the manner of supporting the drill unit on the carriage for rapid and effective adjustment of the drilling angle, the manner of supporting the clamp unit and the drill unit on the track for movement along the work without danger of marring the surface, and the construction and manner of actuation of the latching mechanisms for rapid operation in cooperation with a simple template bar having positioning abutments formed by longitudinally spaced slots.

Other objects and advantages of the invention will become apparent from the following detailed description, taken in conjunction with the accompanying drawings.

BRIEF DESCRIPTION OF THE DRAWINGS

FIG. 2 is an enlarged fragmentary plan view of the drilling apparatus of FIG. 1, partly broken away and shown in cross section;

FIG. 3 is a fragmentary cross-sectional view taken substantially along the line 3—3 of FIG. 2 and showing the drilling apparatus in side elevation;

FIG. 4 is a fragmentary cross-sectional view taken substantially along the line 4—4 of FIG. 2;

FIG. 5 is an enlarged fragmentary cross section taken substantially along the line 5—5 of FIG. 2 and showing the clamping unit with the clamping element thereof engaged with the panel to pull the latter toward the drill unit;

FIG. 5a is a fragmentary view similar to part of FIG. 5, showing the insertion of the clamping element into the panel;

FIG. 5b is a view similar to FIG. 5a showing the withdrawal of the clamping element;

FIG. 6 (sheet 1) is a fragmentary cross section taken substantially along the line 6—6 of FIG. 2;

FIG. 7 is an enlarged view showing the two latching mechanisms in elevation and the template in cross section, the drill-latching mechanism being engaged with the template and the clamp-latching mechanism being disengaged preparatory to indexing movement;

FIG. 8 is a fragmentary cross-sectional view taken substantially along the line 8—8 of FIG. 7;

FIG. 9 is an enlarged fragmentary cross section taken along line 9—9 of FIG. 7;

FIG. 10 is an enlarged fragmentary cross section taken along the line 10—10 of FIG. 7;

FIG. 11 is an enlarged fragmentary view, partly in cross section, showing one of the latching elements fully engaged with the template;

FIG. 12 is a view taken from the right side of FIG. 11;

FIG. 13 is a view similar to FIG. 11 with the latching element disengaged and moved along the template forward the next slot therein;

FIG. 14 is a fragmentary plan view showing the drill and clamp unit of FIG. 1;

FIG. 15 is an enlarged cross-sectional view taken substantially along the line 15—15 of FIG. 14 through the drill unit;

FIG. 16 is an enlarged fragmentary cross section taken along the line 16—16 of FIG. 15; and FIG. 17 (sheet 1) is a fragmentary perspective view of the base of the drill unit.

DESCRIPTION OF THE PREFERRED EMBODIMENT

Figure 1:
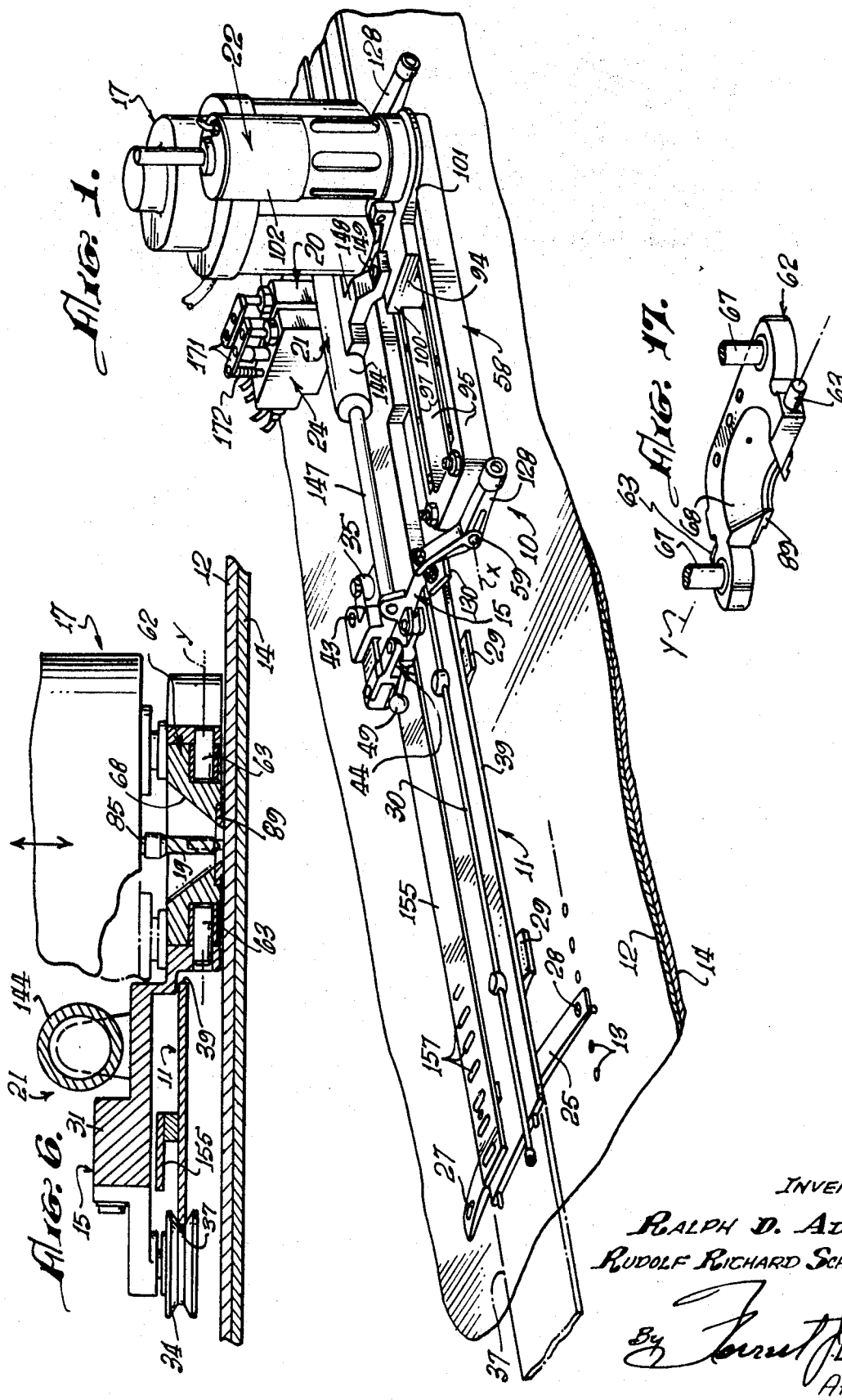
FIG. 1 is a fragmentary perspective view of a drilling apparatus embodying the novel features of the present invention, the apparatus being mounted on a track attached to a work panel to be drilled.

As shown in the drawings for purposes of illustration, the invention is embodied in an automatic drilling apparatus 10 mounted on an elongated track 11 in the form of a rail that is fastened to a curved work panel 12 of the type used in the fabrication of aircraft, the drilling apparatus being movable step by step along the track and operable in each successive position to drill an accurately located hole 13 in the panel substantially normal to the surface in which the hole is drilled. The holes may be drilled, for example, through the overlapped edges of inner and outer panels 14 and 12, or through the panel 12 and into an inner structural element such as a stringer of bulkhead, and typically are formed with countersunk outer ends for receiving the heads of fasteners such as rivets.

In general, the drilling apparatus 10 comprises a carriage 15 that is longitudinally movable along the track 11, a drill unit 17 supported on the carriage with the spindle 18 and drilling tool 19 (FIGS. 6 and 15) of the unit normal to the panel 12, a latching mechanism 20 cooperating with positioning means on the track to locate the drill unit in each successive position, and an actuator 21 for advancing the carriage and the drill unit along the track. Also included in the apparatus is a clamp unit 22 which trails the drill unit and has a clamping element 23 (FIGS. 5, 5a and 5b) insertable in a previously drilled hole 13 and operable to pull the panel toward the carriage 15 for firm engagement with the drill unit preparatory to drilling, and a second latching mechanism 24 also cooperating with the positioning means on the track to locate the clamp unit relative to each hole into which the clamping element is to be inserted. The actuator 21 acts between the two latching mechanisms, each of which is fixed relative to one of the units 17, 22, to walk the units step by step along the track 11.

The Track

While the track 11 may be of various types, including a flat template plate simply bolted to the panel 12 with its opposite side edges spaced from the panel, herein it is a flat rail that is attached to the panel adjacent each end by a transverse, bowed mounting step 25 (FIG. 1) which projects laterally from each side of the rail and has a bolt slot 27 in each end for receiving a fastener 28 anchored in an aligned mounting hole in the panel. The mounting holes are predrilled in the panel in selected positions to locate the track in accordance with the desired location of a row of holes to be drilled in the panel, and may be plugged to seal the panel after the row of holes has been drilled and the track has been removed.

In some instances, it may be desirable to provide additional support for the track 11, particularly in intermediate positions if a long span is used between the mounting straps 25 and the rail is light enough in construction to permit any appreciable lateral deflection under the weight of the drilling apparatus 10. It is to be understood that, while the panel 12 is shown in FIG. 1 in a generally horizontal position beneath the drilling apparatus, the practice often is to drill such panels in upright positions so that the drilling tool 19 is generally horizontal and the weight of the drilling apparatus tends to pull the track downwardly between its end supports. Where the track may not be able to sustain the weight of the apparatus without objectionable deflection, a plurality of vacuum pads 29 may be mounted on the track in longitudinally spaced relation, as shown in FIG. 1, for engagement with the panel and for selective actuation by a vacuum source (not shown) communicating with the pads through a conduit 30 extending along the upper side of the track.

The Drill Carriage

As shown most clearly in FIGS. 1-3, the carriage 15 is disposed in overlying relation with the track 11, on the side thereof opposite the panel 12, and is basically in the form of a horizontally disposed "I" extending longitudinally of the track with an elongated central body 31 overlying and parallel to the lower edge portion of the track as viewed in FIGS. 1 and 2, front and rear legs 32 and 33 extending across the track and carrying supporting and guiding elements 34 and 35 (which herein are peripherally grooved rollers for riding on one edge 37 of the rail) and two parallel legs 38 projecting in the opposite direction from the front and rear ends of the carriage body 31 to support the drill and clamp units 17 and 22 in overhanging relationship with the other side edge 39 of the track opposite the rollers 34 and 35. A third supporting and guiding element 40 (FIGS. 3 and 4) is bolted to the underside of the carriage body 31 about midway between the rollers 34 and 35 to complete the support of the carriage. In this instance, this element is a guide block having a groove 41 in one side that is centered on a common plane with the two rollers to receive the adjacent edge 39 of the track with a loose sliding fit so as to confine the rail between the rollers and the guide block while accommodating a limited degree of tilting motion of the carriage relative to the track.

To facilitate the initial mounting of the drilling apparatus 10 on the track 11, at least one of the guide elements 34, 35 and 40 is mounted on the carriage 15 for movement into an "open" position to pass the rail into the space between the elements. Herein, the roller 35 is pivotally supported on the leg 33 of the carriage by means of an arm 42 (see FIG. 2) which rocks about a pivot 43 generally normal to the track and the panel, and thus is swingable away from the rail edge 37 from the "closed" position in FIG. 2 to the "open" position. The roller is journaled on the leading end of the swingable arm, and a toggle joint 44 is connected between a pivot 45 at the trailing end of the arm, beyond the pivot 43, and a pivot 47 on the drill carriage, the central or "knee" pivot 48 of the toggle joint being straight when the roller 35 is in the "closed" position, and cocked to the rear (to the left in FIG. 2) when the roller is in the "open" position.

A manually graspable handle 49 is connected to one link 50 of the toggle joint 44 to facilitate shifting of the roller 35 from one position to the other, and an adjustable setscrew 51 (FIG. 2) on the other link 52 is positioned to abut against a stop surface 53 on the carriage to limit forward movement of the knee pivot 48, thus determining the condition of the toggle joint when the roller is "closed." The pivot 45 connecting the toggle joint to the roller arm 42 is free to move to a limited extent in a notch 54 in the arm, and is urged away from the arm by a coiled spring 55 confined in a recess at the bottom of the notch, thereby providing a yieldable connection between the toggle joint and the roller.

When the roller 35 is in the "open" position, the drill carriage 15 can be disposed at an angle with the track 11 and placed thereon with the rollers 34 and 35 level with the edge 37 on one side and with the guide groove 41 level with the edge 39 on the other side. When the panel 12 is upright, the two rollers are placed above the track and the guide block 40 below, and the toggle joint 44 is straightened with the handle 49, throwing the "knee" joint 48 overcenter and closing the roller 35 relative to the other two so as to confine the track securely between the three straddling supporting elements.

It will be seen in FIG. 2 that the free end portions of the other two arms 38 of the carriage 15 are inclined toward the work panel and terminate in coaxial cylindrical sleeves 57 that may be formed integrally with the arms and are aligned on an axis X parallel to the longitudinal axis of the track. Suspended between the arms is an open-centered, generally rectangular frame 58 having coaxial trunnions 59 which are rotatably received in the sleeves 57 and thus mount the frame on the carriage 15 to rock about the axis X. This frame carries both the drill unit 17 and the clamp unit 22 which, therefore, are supported for rocking movement about the axis X relative to the carriage 15 to adjust the angles of the drilling tool 19 and the clamping element 23 in planes perpendicular to the axis X and the longitudinal axis of the track. A tab 60 on the side of the frame adjacent the carriage body 31 is secured to the body by screws 61 which are arranged to tilt the tab and the frame to different selected angular positions about the axis X and to hold the frame securely but adjustably in each such position.

The Drill Unit and Its Mounting

The drill unit 17 is supported on a tiltable base 62 (see FIG. 2) that is mounted inside the frame 58 in an enlarged open portion thereof adjacent its forward end, this base being a specially shaped plate also shown in detail in FIGS. 6 and 17 on the first sheet of drawings. To support the drill base on the carriage frame, two coaxial trunnions 63 project into aligned bores in opposite sides of the base from the adjacent sides of the carriage frame, along an axis Y that is perpendicular to the axis X of the frame. The drill unit, being supported entirely on this base, is tiltable about axis Y relative to the frame and thus is tiltable about both axes X and Y relative to the track and the panel 12. A tab 64 (FIG. 2) is bolted to the forward side of the tiltable drill base and also is secured to the frame by adjusting screws 65 which fix the angle of the drill unit relative to the frame.

Various known types of drill units may be used, a preferred type being shown in FIGS. 3 and 14 and in more detail in FIG. 15. In general, this unit comprises an outer case that is supported on the tiltable base 62 by means of two upright parallel tie rods 67 which are fixed at their lower ends in two bores in the base on opposite sides of a central drill recess 68 therein, and which project upwardly through two cavities in the drill case and through guide bores 69 in plugs 70 closing the upper ends of the cavities One of the cavities is shown in cross section in FIG. 15, wherein it will be seen that the lower end portion 71 is of relatively small cross section and is separated from the larger upper end portion 72 by a partition disc 73 through which the tie rod 67 extends. Two pistons 74 and 75 matching the internal diameters of the chambers formed on opposite sides of the partition disc 73 are secured to the tie rod in the respective chambers.

Accordingly, each upper piston 75 and chamber 72 forms a pneumatic actuating cylinder for feeding and retracting the drill relative to the work, and each lower piston 74 and chamber 71 forms a hydraulic dash pot for controlling the speeds of feed and retraction. For the latter purpose, bleed passages 77 and 78 (FIG. 15) communicate with the dash pot chamber 71 on opposite sides of the piston 74, and also with a flow control valve 79 in the case, to restrict the rate of flow of hydraulic fluid to and from the chamber as the piston moves the cavities. thereto.

The drill spindle 18 is centrally mounted in the drill case between and parallel to, the tie rods 67, and is journaled in antifriction thrust bearings 80 and 81 adjacent its opposite ends. A drive gear assembly 82 is held on the threaded upper end portion 83 of the spindle, above the upper bearing 81, by a nut 84, and an enlarged lower end portion 85 of the spindle below the bearings 80 carries a tool holder 87 in which the shank of the drilling tool 19 is mounted for rotation with the spindle. In this instance, the drilling tool also includes a countersink 88 for cutting a frustoconical enlargement around the outer end of the drilled hole to receive a rivet head.

When the drill case is retracted (raised in FIG. 15) along the tie rods 67, the lower end of the drilling tool 19 is retracted into the recess 68 in the base 62, above the level of the lower surface of an annular drill mask 89 that is set into the bottom of the recess and extends a short distance below the base. As the case is fed downwardly along the tie rods, the drilling tool is extended through the drill mask for engagement with the panel 12.

To rotate the spindle 18 and the drilling tool 19, one or more rotary motors 90 are mounted in the case with the output shafts 91 of the motors parallel to the spindle and drivingly coupled thereto by pinion gears 92 meshing with the gear assembly 82 on the upper end of the spindle. Herein, two such motors are driven by air under pressure that is supplied by a suitable source (not shown) and exhausted through a muffler 93 on the case.

Mounting and Construction of the Clamp Unit

The clamp unit 22 is supported on the tiltable frame 58 of the drill carriage 15 in trailing relation with the drill unit 17 and with the clamping element 23 longitudinally aligned with the axis of the drilling tool 19 for insertion in a drilled hole 13 after the drilling tool has been retracted from the hole and the drill unit has been advanced along the track 11 to a new location. As shown most clearly in FIGS. 1, 2, 4, and 5, a slide 94 is disposed between the elongated parallel side bars 95 of the rear portion of the frame, and is movable back and forth along these side bars on two guideways 97 held on the bars by screws 98.

As will be seen in FIGS. 4 and 5, the slide 94 has a retaining plate 99 on its lower side that is dovetailed into the underside of the frame 58, and has a longitudinal shoulder 100 overhanging the guideway 97 on the left side of the slide and a similar shoulder and a pad 101 extending laterally across the guideway on the right side, downwardly as viewed in FIG. 2, and projecting cantilever fashion beyond the right side bar of the frame. An actuating cylinder 102 of the clamp unit 22 is mounted on this pad beside the drill unit 17 and is connected to the clamping element 23 by a lever 103 (see FIGS. 2, 5, 5a and 5b) which extends back over the frame 58 to the upper end of the clamping element.

One clamping unit that is suitable for use in this drilling apparatus is shown and described in my copending application Ser. No. 782,985, filed Dec. 11, 1968, and now abandoned to which reference is made for details of construction and operation not contained herein. Briefly, and as shown in FIGS. 5, 5a, and 5b, this type of unit has a collet-type clamping element 23 including a head or plunger 104 pivotally connected at its upper end to the free end of the lever 103 and extending downwardly through a guide sleeve 105 slidably mounted in a bore 107 in the slide 94. A mandrel pin 108 extends downwardly from the lower end of the plunger through a collet sleeve 109 having a head on its upper end above an inwardly turned annular stop flange formed around the lower end of the guide sleeve. On the lower end of the pin 108 is a pilot head 110 having an upward taper forming a cam that is engageable with the lower end of the collet sleeve, which is split to form flexible fingers terminating in a plurality of outwardly extending clamping toes 111. A coiled compression spring 112 between the collet sleeve and the plunger 104 urges the collet sleeve downwardly to press the head of the collet sleeve against the stop flange in the guide sleeve.

The lever 103 is pivoted between its ends on a fulcrum 113 carried by a yoke 114 on the upper end of a guide pin 115 that is slidably received in an externally threaded bushing 117 screwed into a threaded bore in the slide 94. To connect the lever to the actuating cylinder 102, the end of the lever remote from the clamping element 23 extends into a notch 118 (FIG. 5) in the lower end of the piston rod 119 of the actuating cylinder, and is coupled to the rod by a pin 120 spanning the sidewalls of the notch and passing through an elongated slot 121 in the lever. The bottom of the notch is formed by two angularly disposed stop surfaces 122 and 123 which determine the limits of angular swinging of the lever. A coiled extension spring 124 is connected between the yoke 114 and the retaining plate 99 of the slide 94 to urge the yoke downwardly to the position shown in FIGS. 5 and 5a.

Above the lever 103, the piston rod 119 extends through a sealed chamber 125 and carries a piston 127 which is movable up and down in the chamber by air under pressure admitted to and exhausted from the chamber on opposite sides of the piston. In the normal or retracted condition of the clamp unit 22, the piston 127, the piston rod 119, the lever 103, the yoke 114, and the clamping element 23 are raised relative to the slide 94, as shown in FIGS. 5b, the collet sleeve 109 being radially collapsed to a diameter less than the diameter of the holes 13 to be drilled by the drilling tool 19. When the clamping element is aligned with such a hole, air is admitted to the upper end of the actuator chamber 127 to lower the lever, the yoke, and the clamping element, inserting the latter through the drilled hole as shown in FIG. 5a as the yoke is lowered against the upper end of the bushing 117.

During continued downward movement of the piston 127 from the intermediate position in which the yoke 114 engages the bushing 117, the lever 103 is swung clockwise (FIG. 5) about the fulcrum 113 to pull the plunger 104 upwardly through the guide sleeve 105, thus pulling the pin 108 upwardly through the collet sleeve 109 as the latter is held down by the coiled spring 112. As a result, the cam on the head 110 is pulled into the split collet sleeve and expands the split end thereof to force the toes 111 outwardly, after which the collet sleeve is raised through the drilled hole 13 until the toes, now at a diameter larger than the hole, are pulled into engagement with the underside of the work. Then, as the piston 127 completes its stroke, the work is pulled toward the underside of the frame 58 and into firm engagement with the drill mask 89 preparatory to drilling the next hole.

To release the work after drilling of a hole has been completed, air is introduced into the lower end of the chamber 125 to raise the piston 127, first rocking the lever 103 counterclockwise back to the position in FIG. 5a, and then raising the now collapsed clamping element 23 out of the drilled hole. Subsequently, the clamp unit 22 is moved to the next hole.

As will be seen in FIGS. 1-3, an arm 128 is mounted on each end of the frame 58 with a roller 129 rotatably mounted on the free end of the arm and positioned to ride on the panel 12 along the free edge of the frame, thus normally holding the carriage and the frame away from the panel to avoid marring of the work during advances of the drilling apparatus 10 along the track 11. These arms are pivoted between their ends on the trunnions 59, extend both toward and away from the track from the trunnions, and have ends adjacent the track that are spring-urged upwardly away from plates 130 on the carriage.

Each of these plates 130 carries a bolt 131 that extends slidably through the arm 128 (see FIG. 3) and a coiled spring 132 is telescoped onto the bolt between the arm and the plate so as to urge the arm yieldably away from the plate. Thus, the springs normally act to rock the rollers 129 toward the panel 12, thereby urging the frame 58 away from the panel, but are yieldable to accommodate movement of the frame toward the panel in response to the pulling force applied by the clamp unit 22 while the drilling apparatus 10 is stationary. The clearance in the groove 41 in the guide block 40 permits the carriage to rock toward the panel, ordinarily without twisting the track, so that the drill mask 89 can be pressed against the panel as drilling is initiated.

A trigger valve 133 (FIGS. 15 and 16) is included in the drill unit 17 to signal when the unit is properly engaged with the panel 12 for each drilling operation, and herein includes a plunger 134 projecting downwardly from the base 62 of the drill unit to be engaged and depressed by the panel as the drill unit is pulled toward the panel. The plunger is guided for up and down movement in a bore 135 (FIG. 16) and abuts against the lower end of a valve spool 137 in a valve body 138 below a coiled compression spring 139 which urges both the spool and the plunger downwardly, the trigger valve being closed in the "down" position to prevent air from flowing from an input line 140 to an output line 141.

When the plunger 134 is raised as a result of engagement with the panel 12, the spool 137 is raised to the "open" position (FIG. 26) in which air flows through the spool to the line 141. This pneumatic signal is used to initiate drill operation, including rotation of the air motors 90 and feeding of the drill case toward the panel by the cylinders 72. It will be seen in FIGS. 15 and 16 that the trigger valve 133 is open when the drill mask 89 is in engagement with the panel, leaving a narrow gap 142 between the drill base 62 and the panel around the drill mask. Cushioning feet 143 (FIG. 3) are bolted to the underside of the frame 58 adjacent the end thereof opposite the drill unit and with lower sides in a common plane with the underside of the drill mask 89 to provide firm three-point support for the overhanging portion of the carriage during drilling.

Description of the Actuator

The actuator 21 for indexing or advancing the drilling apparatus 10 along the track 11 from one drilling position to the next is in the form of a reciprocating actuator including a cylinder 144 extending longitudinally of the track and fixed relative to the clamp unit 22, and a piston 145 guided for back-and-forth movement in the cylinder and mounted on a piston rod 147, also extending longitudinally of the track, and fixed relative to the drill unit 17 and the carriage 15. Thus, during introduction of actuating fluid under pressure to one end of the cylinder, the left end as viewed in FIG. 2, the piston 145 is shifted to the right in the cylinder to advance the carriage and the drill unit to the right relative to the cylinder and the clamp unit. Similarly, when pressure fluid is admitted into the right end of the cylinder while the drill unit and the carriage are held stationary on the track, the cylinder is shifted to the right relative to the piston to advance the clamp unit to the right along the ways 97 and toward the drill unit.

For the L-shaped purposes, the cylinder 144 is of a conventional type having appropriate fluid flow lines communicating with its opposite end portions to receive pressure fluid, herein air, from the source through suitable controls, and is attached to the clamp unit slide 94 by a generally L-shaped bracket 148 shown most clearly in FIGS. 1 and 2. This bracket has a relatively narrow leg that extends along and is bolted to the adjacent side of the cylinder, and a wider, right-angle leg that extends away from the cylinder over the slide and is bolted thereto at 149, thus connecting the cylinder and the slide for back-and-forth movement as a unit.

The piston rod 147 projects through sealed openings in the opposite ends of the cylinder 144 and is considerably longer than the cylinder to permit a preselected range of motion of the cylinder along the rod and accommodate the full amount of relative longitudinal motion of the drill unit and the clamp unit needed for the maximum spacing between holes to be drilled. Each end of the rod is fast in an upstanding lug 150 on the drill carriage and thus is rigidly attached to the carriage in overlying relation therewith, the lugs preferably being positioned close to the front and rear ends of the carriage. A dash pot may be incorporated in the actuator to cushion its movements.

Construction and Operation of the Latching Mechanisms

As previously mentioned, latching mechanisms 20 and 24 cooperate with the positioning means to locate the two units 17 and 22 along the track 11, and the latching mechanisms also cooperate with the actuator 21 in anchoring the clamp unit and the drill unit to the track during successive steps in the feeding of the drilling apparatus 10. In general, each latching mechanism comprises a latching element 152,153 (see FIG. 7) movable into and out of engagement with the positioning means, and an actuator 154, herein pneumatic, for effecting such movement, including extension of the latching element into engagement and retraction of the element from engagement. Special provisions are also made for using the latching elements to sense arrival of the associated units at the desired new position along the track, for latching the elements automatically as an incident to such arrival, and for signaling readiness of the unit for the next operation, simply, and in a manner which minimizes the possibility of error.

Herein, the drill latching mechanism 20 is mounted on the forward portion of the carriage 15, beside the arm 32 (see FIG. 2) which carries the guide roller 34, and projects laterally from the carriage into overhanging relation with the track 11 and the positioning means thereon. The clamp latching mechanism 24 is disposed in trailing, side-by-side relation with the drill latching mechanism, in overhanging relation with the track, and is fastened to the side of the actuator cylinder 144.

While the positioning means may take various forms, the illustrative form is an elongated template rail 155 which overlies the track and is bolted thereto in spaced parallel relation with a plurality of longitudinally spaced, laterally elongated slots 157 formed in the template at precisely the spacing selected for the row of holes to be drilled in the work panel 12. The slots thus constitute the positioning means, and the latching elements 152 and 153 are fingers which are insertable in the slots with snug fits so as to be positioned longitudinally along the track by the positioning slots. The slots are appreciably longer than the width of the latching fingers, as shown in FIG. 8, to receive the fingers freely despite possible variations in the lateral position of the fingers relative to the template.

With specific reference to FIGS. 7-13, it will be seen that the two latching mechanisms 20 and 24 may be virtually identical and that each latching finger 152, 153 is the lower end portion of a piston rod 158 (FIG. 8) projecting upwardly through a chamber 159 in the body of the latching mechanism. The rod is guided and sealed in coaxial bores 160 and 161 in the lower end of the body and in a plug 162 closing the upper end of the chamber, and a piston 163 on the rod is guided in the chamber for up-and-down reciprocation in response to pressure fluid, preferably air, alternately admitted on opposite sides of the piston through flow passages 164 and 165 opening into the chamber on opposite sides of the piston through a control or reversing valve 167 of the spool type that is incorporated in the latching mechanism alongside the actuator 154.

The illustrative reversing valve 167 of each latching mechanism 20,24 has an air inlet conduit 168 (FIG. 8) for receiving a pneumatic signal through a line 169 when the associated latching finger 152,153 is to be retracted and disengaged from a positioning slot 157. In the case of the drill latching mechanism 20, this signal may be originated by the drill unit 17, which preferably includes a trigger valve (not shown) for opening at the end of the retraction stroke of the drill spindle 18. In the case of the clamp latching mechanism 24, the signal is originated by the drill latching mechanism upon insertion of the drill latching finger 152 in a positioning slot, and thus indicates that the clamp unit 22 may be advanced to the next position preparatory to the drilling of the next hole 13.

When the actuator piston 163 is lowered to insert the finger 152,153 in one of the positioning slots 157, a snap ring 170 on the piston rod above the plug 162 abuts against the plug to limit downward motion of the piston in the position shown in broken lines in FIG. 8, just above the level at which the conduit 165 opens into the chamber 159. On the upper end of the piston rod is an arm 171 which moves up and down with the rod and projects laterally across the top of the control valve 167 to an adjustable connection 172 with a plunger 173 forming the actuator of a second control valve 174 (FIGS. 9 and 10). Between the piston rod 158 and this connection, the upwardly projecting rod end portion 175 (FIG. 8) of the spool of the first control valve 167 extends slidably through the arm 171 (see FIG. 8) and carries a stop nut 177 which is fast on the spool above the arm.

Telescoping sleeves 178 and 179 surround the rod portion 175 of the spool, the lower sleeve 179 being fastened to a ring 180 threaded into the upper end of the valve bore and the upper sleeve 178 being fastened to the arm 171. A coiled spring 181 inside these sleeves and around the rod portion 175 is compressed between the arm 171 and the upper head 182 of the spool to urge the latter down to the normal position shown in FIG. 8 in which the conduit 165 communicates with the conduit 168 between the upper two spool heads 182 and 183 to admit actuating air into the lower end portion of the chamber 159.

When the valve spool is raised far enough to lift the lower head 186 above a branch conduit 168a of the conduit 168, the upper head 182 is lifted by pressure to a level above the level of the conduit 164 leading to the upper portion of the chamber 159. Accordingly, air from the line 169 is admitted, almost immediately after the initial actuation, into the chamber above the piston 163, thereby urging it and the rod 158 back toward the positioning template 155. Accordingly, the associated latching finger 152,153 is pulled out of a slot 157 and then moved immediately back toward the template for reengagement therewith. The valve spool remains in the raised position as long as actuating air pressure is maintained in the line 169.

Re-insertion of a latching finger 152,153 in the slot 157 from which the finger was pulled, however, is prevented by a spring-actuated stop latch 184 which snaps from a retracted position to a blocking position as soon as the retracting finger is clear of the slot. A bleed plunger 185 (see FIG. 8) mounted in the lower end of the valve bore and urged upwardly toward the spool by a coiled spring 187 rises with the spool and then controls the eventual rate of return of the spool under spring force by permitting restricted exhausting of air from the lower end of the valve bore through a bleed passage 188.

The details of the spring-actuated stop latches 184 are shown most clearly in FIGS. 7 and 11-13 wherein it will be seen that the lower end of the piston rod 158 is slotted at 189, each stop latch comprising a generally triangular plate that is disposed in the slot 189 and pivotally mounted on the piston rod by a pin 190. A coiled spring 191 in the slot is compressed between the bottom of the slot and a shoulder 192 of the stop-latch plate to urge the latter clockwise about the pivot pin, from the retracted position shown in FIGS. 11 and 12, within the slot 189, to the blocking position (FIG. 13) in which the lower end 193 or nose of the stop-latch plate projects to the left beyond the piston rod, in effect increasing the thickness of the rod to greater than the width of the positioning slot 157 in the template 155. An abutment 194 on the stop-latch plate engages an opposed abutment 195 formed by the bottom wall of the slot in the piston rod to limit clockwise rocking of the stop-latch plate in the blocking position in FIG. 13.

With this arrangement, the latching finger 152,153 may be pressed against the top of the template 155 as shown in FIG. 13, between two positioning slots 157 therein, with the associated stop-latch plate 184 in the blocking position shown in FIG. 13. Then, as the latching mechanism 20,24 is moved relative to the template, the nose 193 of the stop-latch plate slides along the template until it "finds" and snaps into the next positioning slot 157. Thus, the latching mechanisms operate automatically to couple the drill and clamp units to the template as an incident to movement of the latching fingers 152,153 into alignment with each successive positioning slot along the template.

To prevent accidental reverse motion of a latching mechanism 20,24 along the template 155 while the latching mechanism is in the retracted condition shown in FIG. 8 and on the right in FIG. 7, a second, reversely acting stop latch 197 is combined with each latching finger 152,153. Each of these reverse latches comprises a rockable plate having a rearwardly projecting free end portion 198 (FIG. 13) generally in the shape of a sector of a circle and including a toe 199 for insertion into the positioning slots as shown on the right in FIG. 7, and urged downwardly toward the positioning template by a coiled spring 200 shown most clearly in FIGS. 8 and 12.

When this reverse latch 197 is in the condition shown on the right in FIG. 7, and also in FIG. 8, with the toe 199 in a positioning slot 157, the arcuate trailing side abuts against the right sidewall of the positioning slot to prevent reverse motion of the latching mechanism 20,24. At the same time, forward motion is permitted because the inclined front edge 201 of the plate abutting against the left sidewall of the slot forms a cam by which the reverse latch is disengaged from the slot against the urging of the spring 200, as shown in FIG. 13. Thus, each reverse latch, in effect, constitutes a ratchet permitting only forward motion of the associated latching mechanism, and snapping into each successive positioning slot along with the associated latching finger.

The second control valve 174 (FIGS. 9 and 10) of each latching mechanism 20,24 is used to signal the insertion of the associated latching finger 152,153 in a positioning slot 157 for initiation of subsequent operations of the drilling apparatus 10. As previously described, raising of the arm 171 attached to the upper end portion of the piston rod 158 not only shifts the spool of the reversing valve 167 to a raised position, but also acts through the connection 172 to raise the plunger 173 of the second valve 174. This valve is a spool valve which is open when the plunger is up, as shown in FIG. 9, thus establishing communication between a pressurized input line 202 and a second or output line 203 for transmitting pressure to a controlled device. When the plunger is down, with a snapring 204 thereon against the body of the valve, the valve is closed so that no pressure is transmitted to the output line.

Since the plunger 173 is raised to the closed position in FIG. 9 when the associated latching finger 152,153 is pressed against the template 155, and is lowered to the open position shown in FIG. 10 as the finger is inserted into a positioning slot 157, opening of the valve produces a pressure signal in the output line 203, indicating that the associated clamp or drill unit 17 or 22 is properly positioned for the next operation. With respect to the drill latching mechanism 20, this signal is applied to the line 169 of the clamp latching mechanism to pull the clamp latching finger 153 preparatory to feeding of the clamp unit. With respect to the clamp latching mechanism 24, the signal is applied to the control system of the clamp unit to initiate the clamping operation.

SUMMARY OF OPERATION

Although the manner of operation of the drilling apparatus 10 should be readily apparent from the foregoing detailed description of the various components and assemblies, the features of the present invention may be more readily understood after a summary of the operational steps and the sequence in which they occur. It is to be understood that the apparatus will include a control system for correlating the various operations and producing the desired sequence thereof, such a system being well within the skill of the art. In addition to a source or sources of actuating fluid under pressure and both manual and automatic control valves, the system may include so-called pneumatic logic elements for receiving air signals and actuating the various mechanical components in response to such signals.

Beginning with panels 12 and 14 positioned for drilling and with a template 155 prepared with slots 157 arranged along the template in accordance with the desired spacing of the holes in the panel, the track 11 is mounted on the work by drilling the required number of mounting holes in positions selected so that the template will be held in the proper position relative to the work. With a track of the type shown in FIG. 1, two laterally spaced mounting holes are drilled for each mounting strap 25 of the track, and the mounting straps are bolted in place with the template 155 bolted to the track. If the drilling apparatus 10 is to be supported directly on the template, the latter is bolted to the work at two or more spaced locations. In addition, at least one first hole 13 is drilled in the work in alignment with the first positioning slot 157 of the template.

After the track 11 has been made ready, the drilling apparatus 10 is placed on the track with the movable roller 35 in the "open" position so that the track fits readily between the three supporting and guiding elements. If the panels 12 and 14 are in an upright position, the rollers 34 and 35 are placed on the upper edge 37 of the track with the guide block 40 on the lower edge and the drill and clamp units 17 and 22 slung below the track. Then the toggle joint 44 is thrown to the position shown in FIGS. 1 and 2, by means of the handle 49, thereby tightening the roller 35 against the track under the yieldable force of the spring 55 at the end of the toggle joint 44. Initially, the clamp latching mechanism 24 is latched to the first slot 157 in alignment with the predrilled hole 13, and the drill-latching mechanism 20 is latched to the next slot 157 in alignment with the next area to be drilled. In case of very closely spaced holes, the two latching mechanisms may be set up to act on other than successive slots.

To set the drilling tool 19 normal to the surface to be drilled, the angle of the frame 58 relative to the carriage 15 about the axis X is adjusted by means of the adjusting screws 61 on the tab 60, and the angle of the base 62 of the drill unit 17 about the axis Y is similarly adjusted by means of the screws 65 on the tab 64. One such adjustment usually is sufficient for a given row of holes, and may be sufficient for parallel rows of holes to be drilled in a given panel if the curvature is approximately the same for all of the rows.

With the several air lines connected to the drill and clamp units 17 and 22, the latching mechanisms 20 and 24, and the indexing cylinder 144, operation is initiated by activating the air system, turning on the air to the clamp unit cylinder 102 to insert the clamping element 23 in the predrilled work hole, expand the collet sleeve 109, and pull the panels 12 and 14 toward the underside of the carriage 15. Such pulling of the work toward the carriage serves to shift the carriage toward the panel 12 until the drill mask 89 and the positioning feet 143 engage the panel, thereby positioning the drill unit 17 properly against the panel. The spring-loaded roller arms 128 yield to accommodate this relative motion of the carriage and the panel.

As the drill mask 89 is drawn toward the panel 12, the trigger valve 133 opens to signal readiness for the drilling operation and, assuming the drill air control is "on," starts the rotary air motors 90. At the same time, the feed cylinders 72 are pressurized to begin feeding the drill case toward the panel to feed the drilling tool 19 into the work in alignment with the positioning slot 157 in which the drill-latching mechanism 20 is engaged. Thus, the rotating drilling tool engages and is fed into the panel to the depth selected by the setting of the valve for terminating the feed stroke, first forming the hole and then countersinking the outer end near the end of the stroke.

When the selected depth is reached, a depth-control valve 204 in the top of the case is blocked by an adjustable stop 205 on a bracket 207 on one of the tie rods 67, and thus produces an air signal which actuates the cylinder-feed control to terminate the feed stroke and initiate retraction of the drill. At the end of the retracting stroke, the trigger valve for sensing full retraction deactivates the drill. Thus, one drilling cycle is completed and the drill unit 17 is ready for indexing movement to the next location to be drilled.

To initiate the indexing operation, an air signal is applied through the control system, and in response to retraction of the drill, to the input line 169 of the drill latching mechanism 20, thereby raising the piston 163 in the chamber 159 to pull the latching finger 152 out of engagement with the template 155 and to shift the reversing valve spool upwardly far enough to admit air into the lower end of the valve bore so that the spool is forced upwardly to the raised position in which air from the line 169 is admitted to the upper end of the chamber 159. This reverses the motion of the piston 163 almost immediately to force the latching finger 152 back toward the template. The stop-latch plate 184, however, snaps into the blocking position as the finger is withdrawn from the slot 157, thus blocking reentry of the finger into the slot and holding the finger in the position shown on the right in FIG. 7 and also in FIG. 8. The ratchet plate 197 remains in the slot to prevent reverse movement of the finger along the template. Also, the clamp unit cylinder 102 is actuated to raise the piston 127, releasing the collet sleeve 109 and pulling it out of the predrilled hole 13.

With the drill latching finger 152 pulled out of the template 155 and pressed downwardly thereon, the clamp unit 22 disengaged, and the clamp latching finger 153 still engaged in the template, air is admitted from the control system into the left end (FIG. 2) of the indexing cylinder 144 to drive the piston 145 and the drill carriage 15 to the right, thereby sliding the drill latching finger 152 along the template toward the next slot 157 in the template. As this motion starts, the toe 199 of the ratchet plate 197 is cammed out of the positioning slot for the hole just completed and slides along the template with the finger. As the latter moves into alignment with the slot for the next hole, the toe 193 of the stop latch 184 enters the slot and is returned to its retracted position, and both the finger and the ratchet plate 197 enter the slot as shown on the left in FIG. 7 and also in FIGS. 11 and 12, thereby latching the drill unit 17 in the proper position for the next drilling operation.

Entry of the drill latching finger 152 into this slot 157 is accompanied by downward movement of the piston rod 158 and the laterally projecting arm 171 thereon so that the spool of the reversing valve 167 is returned to its lowered position and the plunger 173 of the second valve 174 is lowered to open this valve (FIG. 10) and pressurize signal line 203. This pneumatic signal is applied through the control system to the input line 169 of the clamp-latching mechanism 24, which thus pulls clamp-latching finger 153 from its slot 157 in the template 155 and actuates the valve 167 to reverse the actuator 154 and press the clamp-latching finger 153 against the template 155 with the stop-latch plate 184 in engagement with the top of the template and the ratchet plate 197 disposed in the slot to prevent reverse motion. Then the indexing cylinder 144 is actuated by air admitted into the right end of the cylinder to shift the latter to the right relative to the latched drill carriage 15, sliding the clamp unit 22 along the ways 97 toward the drill unit 17 and moving the clamp-latching finger 153 along the template to the next slot 157 in the template. As the finger moves into alignment with the slot, the finger, including the stop-latch plate 184 and the ratchet plate 197, snaps into the slot.

Entry of the clamp latching finger 153 into the slot 157 results in opening of the second valve 174 of the clamp-latching mechanism 24, and the signal thus produced is used to initiate the next cycle, including insertion, expansion, and clamping retraction of the clamping element 23, initiation of rotation and feeding of the drill unit 17, and repetition of the indexing cycle. Accordingly, the drilling apparatus 10 travels step by step along the template 155 and the track 11 while drilling accurately located holes 13 in accordance with the spacing of the slots along the template.

It will be evident that a large number of holes may be drilled with one setup, the only practical limitation being the length of the track 11. Also, successive holes need not be drilled at the same spacing as the preceding holes, since each position of the drill unit 17 is governed solely by the position of the positioning slots 157 along the template 155, and further in view of the fact that the position of the clamp unit 22 relative to the drill unit is variable within the range of motion permitted by the indexing cylinder 144 and the length of the bars 95 of the frame 58 supporting the clamp unit slide 94.

Conclusion

From the foregoing, it will be seen that the present invention provides a novel apparatus 10 for feeding a tool such as the drill unit 17 step by step along a track 11 mounted on a workpiece and performing successive operations on the workpiece in successive positions along the track. In each position, the tool unit may be clamped securely against the workpiece with the tool axis normal to the surface upon which the operation is to be performed, and is precisely located relative to the track to insure that the drilled hole or other operation is precisely located on the work. Moreover, the step-by-step indexing of the apparatus is accomplished in a novel and relatively simple manner which substantially eliminates error and makes the apparatus fully automatic so as to eliminate the need for constant attention by an operator. Of course, the apparatus also minimizes operator skill as a significant factor in obtaining high-quality results.

It also will be seen that, while a specific embodiment has been illustrated and described, and a particular use has been suggested, various modifications and other uses may be made without departing from the spirit and scope of the invention. As one example, a riveting unit may be incorporated in the apparatus to set rivets in the holes after drilling, or might be substituted for the drill unit 17 in tracking relation with a clamp unit 22. Other modifications and uses will suggest themselves to those skilled in the art.

We claim:

1. Drilling apparatus movable along an elongated track to drill a row of spaced holes in a workpiece disposed alongside the track in accordance with the spacing of positioning means on the track, said drilling apparatus having in combination:

a carriage mountable on the track with one side portion in overlying relation with the track and another side portion overhanging the workpiece along one side of the track, said carriage having means thereon for supporting the carriage on the track for movement longitudinally thereon to different drilling positions along the track;

a drill unit mounted on said overhanging side portion of said carriage in generally normal relation with the workpiece and offset laterally from the track, said drill unit having a mounting for a reciprocable drilling tool for drilling holes in the workpiece alongside the track;

a slide mounted on said carriage for movement therewith along the track and also for back-and-forth movement relative to the drill unit longitudinally of the track;

a clamp unit mounted on said slide in trailing relation with said drill unit as the latter moves in one direction along the track, said clamp unit having a clamping element offset laterally from the track and aligned with said mounting, longitudinally of the track, to follow the tool as said carriage moves along the track;

a drill-latching mechanism mounted on said carriage in fixed relation with said drill unit and having a drill latching element movable from one of the positioning means to the next as the carriage moves along the track, said latching element and said positioning means cooperating to locate said drill accurately in successive positions along the track, and said latching mechanism including means for releasing said latching element in one position along said track and reengaging the element in the next position;

a clamp latching mechanism carried by said slide in fixed relation with said clamp unit, and having a clamp-latching element engageable with the positioning means and means for releasing and reengaging the element with the positioning means as said slide is moved from one position to the next along the track; and a stepping actuator having first and second relatively reciprocable parts, one of said parts being connected to said slide and the other to said carriage to advance the carriage from one position to the next while said drill-latching mechanism is released and said clamp-latching mechanism is engaged in preceding position, and to advance said slide from said preceding position to the next position after said drill-latching mechanism is reengaged and while said clamp-latching mechanism is released, thereby moving said clamp element to a drilled hole after advancing the drill unit to a new position in which a hole is to be drilled.

2. Drilling apparatus movable along an elongated track to drill a row of spaced holes in a workpiece disposed alongside the track in accordance with the spacing of positioning means on the track, said drilling apparatus having, in combination:

a carriage mountable on the track for movement longitudinally thereof through successive drilling positions along the track;

a drill unit on said carriage at a preselected angle relative to the track and the path of the carriage thereon, and having a mounting for a tool for drilling holes in the workpiece in said drilling positions;

a clamp unit having a clamping element insertable in each hole drilled by said drill unit and operable to pull the workpiece toward said carriage and said drill after insertion of the clamping element therein;

means for mounting said clamp unit on said track for movement longitudinally of said track in trailing relation with said drill unit as the latter moves in one direction through said positions, said mounting means connecting said drill and clamp units for movement together toward and away from the workpiece whereby the drill unit is held against the workpiece by said clamp unit; and actuating means for moving said carriage and said drill unit successively from one position to the next and latching the carriage temporarily to the positioning means in each of said positions, and for moving said clamp unit into each of said positions after drilling of a hole by said drill unit and latching said clamp unit temporarily to the positioning means with said clamping element aligned with the hole for insertion therein.

3. Drilling apparatus as defined in claim 2 in which said actuating means include two latching mechanisms connected to said drill and clamp units and each having a latch element engageable with and disengageable from the positioning means, and an actuator for shifting the latching element out of engagement with the positioning means and then urging the element back for reengagement.

4. Drilling apparatus as defined in claim 3 in which each latching element is a finger movable toward and away from the positioning means by the associated actuator for insertion in slots spaced along a template constituting the positioning means, the finger being sized to enter such slots with a longitudinally snug fit to locate the latching mechanism in accordance with the spacing of such slots, said finger having a stop latch mounted thereon for movement to a blocking position in which the finger is prevented from entering an aligned slot and means urging the stop latch yieldably toward the blocking position whereby the stop latch moves to the blocking position as the finger is withdrawn from a slot and prevents reentry of the finger into the template until the finger has been slid along the template to the next slot.

5. Drilling apparatus as defined in claim 4 in which said stop latch has a toe projecting forwardly from the finger in said blocking position and slidable along the template and into the next slot as the finger is moved to the next slot.

6. Drilling apparatus as defined in claim 3 in which each of said latching elements is a finger movable into and out of engagement with said positioning means, and further including a stop latch operable as an incident to withdrawal of the finger from engagement to prevent further engagement until the finger has been advanced to a new position along the positioning means, and a reverse latch preventing reverse movement of the withdrawn finger along the positioning means but permitting forward movement.

7. Drilling apparatus as defined in claim 6 in which each of said reverse latches comprises a ratchet yieldably urged toward the positioning means and into engagement therewith, and having a reverse-motion blocking surface and a forwardly facing cam for lifting the ratchet out of engagement in response to forward motion.

8. Drilling apparatus as defined in claim 6 in which each of said stop latches is mounted on the associated finger for movement forwardly from a retracted position to a blocking position, and means yieldably urging the stop latch toward said blocking position but permitting retraction thereof as an incident to movement of the finger into a new position along the positioning means.

9. Drilling apparatus as defined in claim 2 in which said carriage has a frame mounted on one side thereof in overhanging relation with the workpiece with said drill and clamp units on said frame, said mounting means including a longitudinally movable slide on said frame carrying said clamp unit.

10. Drilling apparatus as defined in claim 9 in which said drill unit is mounted on said frame for selective adjustment of said angle about perpendicular axes.

11. Drilling apparatus as defined in claim 10 in which said frame is pivoted on said carriage for adjustment about a first axis parallel to said track and said drill unit is mounted on said frame for adjustment about a second axis perpendicular to said first axis.

12. Drilling apparatus as defined in claim 9 in which said frame is supported on said carriage to be in spaced relation with the workpiece and has yieldable means thereon for riding on the workpiece and holding the frame yieldably away from the workpiece during advancing of the carriage.

13. Drilling apparatus movable along an elongated track mounted on a workpiece to drill a row of spaced holes in the workpiece in accordance with the spacing of positioning means on the track, said drilling apparatus having, in combination:
   a carriage mountable on the track for movement longitudinally thereof through a series of drilling positions along the track;
   a drill unit supported on said carriage at a preselected angle with the workpiece and having a holder for a tool for drilling holes in the workpiece in said drilling positions;
   first and second latching mechanisms having latching elements that are selectively engageable with the positioning means on the track, said first latching mechanism being supported on said carriage in a fixed relation with said drill unit and said second latching mechanism being supported on the carriage in longitudinally movable relation with said drill unit; and
   a stepping actuator having first and second relatively movable parts connected respectively to said first and second latching mechanisms to advance one of said mechanisms relative to the other along the positioning means to a new position and then advance the other mechanism relative to said one mechanism, thereby feeding said drill unit along the track through successive drilling positions located by the positioning means.

14. Drilling apparatus as defined in claim 13 further including a clamp unit on said carriage in fixed relation with said second latching mechanism and trailing, longitudinally movable relation with said drill unit, said clamp unit having a clamping element insertable in holes drilled by the drill unit and operable to clamp the workpiece for successive drilling operations.

15. Drilling apparatus as defined in claim 14 in which said units are mounted on a frame overhanging the workpiece on one side of the track, said drill unit being fixed longitudinally relative to the carriage and tiltable into different selected angles relative to the workpiece.

16. Tool-feeding apparatus movable along an elongated track having longitudinally spaced positioning means thereon to perform a series of operations on a workpiece on which the track is mounted, said apparatus having, in combination:
   a carriage mountable on the track for movement longitudinally thereof through successive operating positions along the track, said carriage having a frame movable alongside the track in overhanging spaced relation with the workpiece;
   tool and clamp units mounted on said overhanging portion in longitudinally spaced relation and having longitudinally aligned tool and clamp elements disposed at preselected angles with the workpiece and movable through successive operating positions along the track, said units being longitudinally movable relative to each other on said carriage, and said clamp unit being operable to draw the carriage and the workpiece together;
   tool and clamp-latching mechanisms in fixed relation with said tool and clamp units, respectively, and each engageable with and disengageable from said positioning means in successive positions along the track to locate each unit accurately in each position; and
   a stepping actuator connected between said latching mechanisms to shift them alternately apart and together, longitudinally of the track, thereby to walk the apparatus step by step along the track.

17. Tool-feeding apparatus as defined in claim 16 in which said overhanging portion is a frame having one of said units mounted on its leading end portion and the other unit mounted on its tracking end portion for sliding movement toward and away from said one unit on said frame.

18. Tool-feeding apparatus as defined in claim 17 in which said frame is adjustably tiltable about an axis extending longitudinally of said track for adjustment of said angle.

19. Tool-feeding apparatus as defined in claim 18 in which said tool unit is mounted on said frame for further adjustment of said angle about an axis perpendicular to said longitudinal axis.

20. Tool-feeding apparatus as defined in claim 17 further including means for holding said frame in spaced relation with the workpiece during longitudinal movement, and yielding to permit drawing of said frame toward the workpiece by said clamp unit.

21. Tool-feeding apparatus as defined in claim 20 further including means on said frame for engaging the workpiece an stopping said drawing when the tool unit is in a preselected relation relative to the workpiece in each position.

22. Tool-feeding apparatus as defined in claim 16 further including positioning and guiding elements on said carriage for engaging opposite sides of the track and holding the carriage thereon, one of said elements being selectively movable to an "open" position to receive the track between the elements.

23. Tool-feeding apparatus as defined in claim 22 in which said positioning and guiding elements include rollers for riding on the track.

24. Tool-feeding apparatus as defined in claim 23 in which said positioning and guiding elements also include a grooved guide element for straddling the side of the track adjacent said overhanging portion with a loose fit permitting tilting of the carriage relative to the track.

25. Tool-feeding apparatus movable along an elongated track having longitudinally spaced positioning means thereon to perform a series of operations on a workpiece alongside the track, said apparatus having, in combination:
a tool unit for performing said operations;
a carriage for said tool unit mountable on the track and movable longitudinally thereof to advance the tool unit along the track;
a latching mechanism mounted on said carriage in fixed relation with said tool unit and engageable with the positioning means along the track to hold the tool unit in successive accurately located positions along the track, said latching mechanism also being disengageable from the track to permit movement of the carriage along the track;
a stepping actuator connected to said carriage and acting between the latter and the track in advance the tool unit from one of said positions to the next while said latching mechanism is disengaged;
means operable as an incident to arrival of said drill unit at each successive position along the track to engage said latching mechanism and hold the tool unit in the position during performance of the operation; and
means operable in response to completion of each operation to disengage said latching mechanism and actuate said actuator to advance the tool unit to the next position.

26. Tool-feeding apparatus as defined in claim 25 in which said latching mechanism includes a reciprocating latching element movable toward and away from positioning means in the form of a series of slots spaced longitudinally along a template on the track, and a latching actuator for pulling said latching element from each slot upon completion of each operation and thereafter pressing the latching element against the template to slide along the latter and snap into the next positioning slot as said stepping actuator advances the tool unit along the track.

27. Tool-feeding apparatus as defined in claim 26 in which said latching element is a finger insertable in each of said slots to latch said mechanism to the template, and has a stop latch movable between a retracted position within the finger and a blocking position projecting out of the finger and increasing the thickness thereof to greater than the width of the slots.

28. Tool-feeding apparatus as defined in claim 27 in which said stop latch is yieldably urged to said blocking position to snap out of said finger upon withdrawal of the finger from a slot, and to be forced into the next slot and back to said retracted position as the finger is moved into the next slot.

29. Tool-feeding apparatus as defined in claim 27 in which said latching mechanism further includes a reverse latch insertable in each slot with the finger and movable between blocking and retracted positions, said reverse latch preventing reverse motion of said latching mechanism in its blocking position, being yieldably urged to its blocking position, and being cammed out of each slot in response to forward motion of the latching mechanism relative to the template.

30. Tool-feeding apparatus as defined in claim 25 further including a second latching mechanism spaced longitudinally from the first mechanism and also engageable with and disengageable from said positioning means in successive positions thereon, said stepping actuator being connected between the two latching mechanisms and operable to step first one and then the other along the positioning means.

31. Tool-feeding apparatus as defined in claim 30 in which each of said latching mechanisms includes a reciprocating latching element movable toward and away from positioning means in the form of a series of slots spaced longitudinally along a template on the track, and further includes a latching actuator for pulling the associated latching element from each slot preparatory to indexing of the latching mechanism and reengaging the latching element as the next slot as an incident to movement of the latching element into alignment with the slot.

32. Tool-feeding apparatus as defined in claim 31 in which said latching actuators pull said latching elements from said slots and then pass the elements against the template to slide along the latter and snap into the next slots.

33. Tool-feeding apparatus as defined in claim 31 in which said stepping actuator is a fluid-operated reciprocating cylinder connected to one of said latching mechanisms and having a piston rod connected to the other mechanism to step the mechanisms along the track.

34. Tool-feeding apparatus as defined in claim 30 further including a clamp unit movable along the track in fixed relation with said second latching mechanism and having a clamping element engageable with the workpiece adjacent each position of said tool unit, said units being mountable in overhanging relation with one side of the track and said clamp unit operating to draw the tool unit and the workpiece together on one side during each operation.

35. Tool-feeding apparatus as defined in claim 34 in which said clamp unit is mounted on said carriage in side-by-side relation with said tool unit and is movable on said carriage longitudinally of said track, toward and away from the tool unit, for separate indexing of the two units.

36. Tool-feeding apparatus as defined in claim 35 in which said carriage includes a frame overhanging said one side and supporting both said tool unit and said clamp unit, said clamp unit being slidably mounted on said frame and he latter being adjustably tiltable relative to the carriage about an axis parallel to the track to adjust the angle of the tool unit relative to the workpiece.

37. Tool-feeding apparatus as defined in claim 36 in which said tool unit is mounted on said frame for adjustable tilting movement relative thereto about a second axis perpendicular to the axis of said frame.

38. Tool-feeding apparatus as defined in claim 35 further including means on said carriage for holding the carriage in spaced relation with the workpiece during successive steps of the carriage and yielding as the clamp unit draws the workpiece and the tool unit together.

39. Tool-feeding apparatus as defined in claim 38 in which said means for engaging the workpiece comprises arms pivotally carried by said carriage at the leading and trailing ends thereof and spring-urged toward the workpiece, said means having rollers thereon for engaging the workpiece.

* * * * *